(No Model.)

C. E. HEBARD.
ELECTRIC UTERINE BATTERY.

No. 527,788. Patented Oct. 23, 1894.

Witnesses:
George H. White
Geo. E. Shafer

Inventor.
Charles E Hebard
By Ithiel J. Cilley
Attorney.

UNITED STATES PATENT OFFICE.

CHARLES E. HEBARD, OF GRAND RAPIDS, MICHIGAN, ASSIGNOR OF ONE-FOURTH TO HANFORD C. KEITH, OF RHINELANDER, WISCONSIN.

ELECTRIC UTERINE BATTERY.

SPECIFICATION forming part of Letters Patent No. 527,788, dated October 23, 1894.

Application filed July 11, 1894. Serial No. 517,249. (No model.)

*To all whom it may concern:*

Be it known that I, CHARLES E. HEBARD, a citizen of the United States, residing at Grand Rapids, in the county of Kent and State of Michigan, have invented certain new and useful Improvements in Uterine Batteries, of which the following is a specification.

My invention relates to improvements in temporary electrical batteries for medicinal use in connection with the uterus and its kindred organs; and its objects are, first, to provide a battery with which a temporary current of electricity may be induced by the secretions of the uterus and vagina and applied directly to the parts; and, second, to provide a battery with which the fumes of a volatile solution may be forced to act upon the organs at the same time that the electric current is acting thereon. I attain these objects by the mechanism illustrated in the accompanying drawings, in which—

Figure 1:
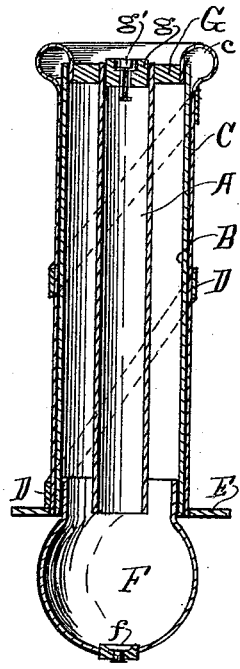
Figure 2:
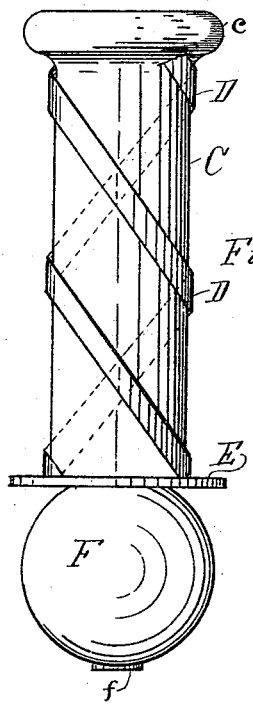
Figure 3:
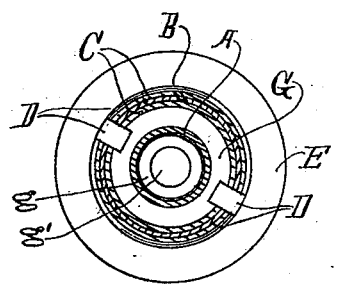

Figure 1 is a vertical cross section of my device. Fig. 2 is an elevation of the same, and Fig. 3 is a sectional plan of the same.

Similar letters refer to similar parts throughout the several views.

In the center of my device I place a small perforated tube A, in the upper end of which I place an air tight stopper g to prevent the gases from escaping when the battery is not in use. I place a hard rubber jacket B, outside of this center tube, leaving a space between them which is designed to be filled with any available absorbent material, as cotton, sponge, &c., which may be filled with any desired healing solution for use in connection with the electric current. For the purpose of forcing the gas from the saturated absorbent to the parts I place a bulb F into the outer end of the hard rubber tube B in position so that any pressure on the bulb will force air, and with it the generated gas in the tube, through to the uterus. The upper ends of the tubes,—i. e., the hard rubber tube B and the central tube A—are held to place and supported by a zinc head G, which fits closely around the inner tube and inside of the outer tube, with room for the introduction of the end of the soft rubber tube or jacket C, to enter and be held firmly to place. At the opposite end of the instrument I secure firmly to the hard rubber tube, outside of the soft rubber tube, a silver flange E that acts a double purpose, first, of preventing the instrument from entering too far into the vagina, and, second, as the positive pole of my battery.

In constructing my battery I first, secure the zinc head G to the inner tube. I then place the end of a soft rubber tube C into the end of the hard rubber tube B and force it over the head so that the whole is held firmly to place. I then turn the soft rubber tube back over the hard rubber tube to form a soft pliable covering therefor and secure the other end firmly to place with the silver flange E; and to complete my battery connection I attach one or more copper ribbons D to the zinc head G and, passing it through, or around the fold c of the soft rubber tube C and, winding it one or more times around the instrument, secure the other end to the silver flange E.

To avert the danger of drawing foul matter into the instrument by the reverse action of the bulb F I place a valve $g'$ into the plug $g$, or at any other suitable place, in the tube A, so arranged that the expansion of the bulb will close the valve and open the valve $f$ in the end of the bulb, for the introduction of air.

In using my instrument as a battery it is inserted into the vagina until the zinc head, or disk, G very nearly touches the mouth of the uterus, when the secretions of the parts coming in contact with the zinc and copper produce an electric current of sufficient power to act beneficially upon the parts, but not of sufficient power to inconvenience the patient. By this manner of applying the electric current I find that I can greatly assist the medicinal effects of the solution contained in the tubes when applied as hereinbefore stated.

Having thus fully described my invention, what I claim as new, and desire to secure by Letters Patent of the United States, is—

1. The combination, in a uterine battery, of an inner perforated tube, a solid outer tube, a zinc head at one end of said tubes and a silver flange at the other end, and the two connected by a copper ribbon, substantially as, and for the purpose set forth.

2. The combination in a uterine battery, of a perforated inner tube, a solid outer tube, an absorbent material between said tubes, said absorbent saturated with a volatile medicinal compound, a plug and valve at one end, and a rubber bulb at the other end, a soft rubber tube over the outer solid tube, a zinc head in one end, and a silver flange on the other end, said head and flange connected by a copper ribbon, substantially as and for the purpose set forth.

3. The combination in a uterine battery of a perforated inner tube, a solid outer tube, an absorbant substance containing a volatile medicinal compound between said tubes, a zinc head at one end, a metallic flange at the other end, a soft rubber tube incasing the outer tube, and a copper ribbon encircling said soft rubber tube and connecting the zinc head and the metallic flange, substantially as and for the purpose set forth.

4. The combination in a uterine battery of a perforated inner tube, a solid outer tube, an absorbent and a volatile medicinal compound within said tube, a zinc head, a silver flange and a copper ribbon connecting them; with an elastic bulb attached to the outer end of the tube, substantially as and for the purpose set forth.

Signed at Grand Rapids, Michigan, this 28th day of June, 1894.

CHARLES E. HEBARD.

In presence of—
E. O. CILLEY,
I. J. CILLEY.